(12) United States Patent
Yashiki et al.

(10) Patent No.: US 10,093,125 B2
(45) Date of Patent: Oct. 9, 2018

(54) MULTIPLE-IMAGE DISPLAY BODY

(71) Applicant: TOPPAN PRINTING CO., LTD., Tokyo (JP)

(72) Inventors: Kazuhiro Yashiki, Tokyo (JP); Akira Kubo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 247 days.

(21) Appl. No.: 14/962,902

(22) Filed: Dec. 8, 2015

(65) Prior Publication Data

US 2016/0089924 A1    Mar. 31, 2016

Related U.S. Application Data

(63) Continuation of application No. PCT/JP2014/064218, filed on May 29, 2014.

(30) Foreign Application Priority Data

Jun. 10, 2013  (JP) .................................. 2013-121625

(51) Int. Cl.
*B42D 25/00* (2014.01)
*B42D 25/36* (2014.01)
(Continued)

(52) U.S. Cl.
CPC ............. *B42D 25/36* (2014.10); *B42D 25/00* (2014.10); *B42D 25/324* (2014.10);
(Continued)

(58) Field of Classification Search
None
See application file for complete search history.

(56) References Cited

U.S. PATENT DOCUMENTS

2008/0037131 A1   2/2008  Steenblik et al.
2011/0027538 A1*  2/2011  Hoffmann .............. B42D 25/47
                                                      283/72
(Continued)

FOREIGN PATENT DOCUMENTS

AU      2010268081       1/2011
DE   10 2009 031 387     1/2011
(Continued)

OTHER PUBLICATIONS

Extended European Search Report dated Feb. 7, 2017 in European Patent Application No. 14811506.6, 8 pages.
(Continued)

*Primary Examiner* — Kyle Robert Grabowski
(74) *Attorney, Agent, or Firm* — Squire Patton Boggs (US) LLP

(57) ABSTRACT

A multiple-image display body includes a spacer layer, a line tone barrier layer stacked on the first surface of the spacer layer, and a multiple-image formation layer stacked on the second surface of the spacer layer. The line tone barrier layer includes first regions, which transmit electromagnetic waves, and second regions, which absorb electromagnetic waves. The multiple-image formation layer includes images that are visible when observed from specific angles over the first regions of the line tone barrier. The image is formed by a contrast resulting from an area ratio of the third region, which scatters electromagnetic waves, and the fourth region, which absorbs electromagnetic waves.

13 Claims, 11 Drawing Sheets

(51) Int. Cl.
    *B42D 25/45*      (2014.01)
    *B42D 25/351*      (2014.01)
    *B42D 25/378*      (2014.01)
    *G02B 27/06*      (2006.01)
    *B42D 25/324*      (2014.01)
    *B42D 25/373*      (2014.01)

(52) U.S. Cl.
    CPC ......... *B42D 25/351* (2014.10); *B42D 25/373* (2014.10); *B42D 25/378* (2014.10); *B42D 25/45* (2014.10); *G02B 27/06* (2013.01)

(56) References Cited

U.S. PATENT DOCUMENTS

2012/0182443 A1*    7/2012    Vincent ................ B42D 25/342
                                                                                   348/222.1
2012/0274998 A1*    11/2012    Holmes ................. B42D 25/29
                                                                                   283/72

FOREIGN PATENT DOCUMENTS

| JP | A-2005-055529 | 3/2005 |
| JP | A-2009-543138 | 12/2009 |
| WO | WO 2011/007343 A1 | 1/2011 |

OTHER PUBLICATIONS

EnglishTranslation of the International Preliminary Report on Patentability dated Dec. 15, 2015, for related PCT Application No. PCT/JP2014/064218, 9 pp.

* cited by examiner

MULTIPLE-IMAGE DISPLAY BODY

CROSS-REFERENCE TO RELATED APPLICATION

This application is a continuation of International Application No. PCT/JP2014/064218, filed May 29, 2014, which is hereby incorporated by reference. International Application No. PCT/JP2014/064218 claims priority to Japanese Application No. 2013-121625, filed on Jun. 10, 2013.

BACKGROUND OF THE INVENTION

The present invention relates to an anti-counterfeiting multiple-image display body for ID cards, passports, and banknotes.

It is desirable that counterfeiting be difficult for items including negotiable instruments such as coupons and checks; cards such as credit cards, cash cards, and ID cards; certificates such as driver's licenses and passports; brand name products; electronic gadgets; and personal authentication media. Such items may thus use display bodies that have superior anti-counterfeiting effects.

Such display bodies often include fine structures (i.e., optical elements) such as diffraction gratings, holograms, and lens arrays. The optical elements, for example, cause dynamic pattern changes when the observation angle changes. This hinders analysis and counterfeiting. Accordingly, such optical elements have a relatively high anti-counterfeiting effect.

In the prior art, there are image display bodies that use optical elements such as those described above. For example, Japanese National Phase Laid-Open Patent Publication No. 2009-543138 describes an image display body that stacks lens array layer and an icon layer to produce continuous movement and create a sense of depth. Such an image display body has been put to practical use due to its high anti-counterfeiting effect.

The image display body of Japanese National Phase Laid-Open Patent Publication No. 2009-543138 is an extremely thin film of 50 µm or less to allow for applications that watermark paper used for currency. This requires extremely high precision for the focal distance of lenses, the size of the lens array, and the icon size so that a high anti-counterfeiting effect can be obtained.

However, with a multiple-image display body including a lens array in a surface layer, contamination of the lens layer in the outermost surface layer by a liquid such as oil or a chemical would result in defects such as loss of the lens effect (condensing effect, magnifying effect) and loss of the desired continuous movement and depth in a display. Such a defect may lead to an authentication failure during actual use of ID cards, passports, and banknotes.

To resolve this defect, WO2011/007343A1 proposes a stacked display body that does not use lenses. The display body of WO2011/007343A1 is a stacked display body that includes a transmittive "line tone barrier layer," a "spacer layer," and a "multiple-image formation layer." The multiple-image formation layer is divided into multiple images at a line tone pitch. Further, the display body is a multiple-image display body of a parallax barrier type that allows for the appearance of multiple images recorded on the "multiple-image formation layer" when viewed over the "line tone barrier layer" in accordance with the observed angle.

The structure of WO2011/007343A1 does not cause a loss in the desired continuous movement and depth of a display even when the uppermost layer is contaminated by a liquid such as oil or a chemical. This is sufficient for actual use in ID cards, passports, or banknotes.

However, the outermost "line tone barrier layer" decreases the light intensity. Thus, it is difficult for the multiple-image display body to show the "multiple images" of a lower layer with sufficient contrast.

Further, authentication that uses transmission light (for example, authentication using watermark) obtains satisfactory contrast. This allows the multiple-image display body to obtain a display effect that produces continuous movement and depth. However, in authentication that uses reflection light, insufficient light intensity lowers the contrast of the lower layer images. This causes difficulties in authentication.

SUMMARY

It is an object of the present invention to provide a multiple-image display body that allows a sufficient display to be obtained even when the outermost layer is contaminated with a liquid and also allows for sufficient image recognition when observed with only reflection light.

One aspect of a multiple-image display body according to the present invention includes a spacer layer including a first surface and a second surface opposite to the first surface. The spacer layer has the form of a thin film. A line tone barrier layer is stacked on the first surface of the spacer layer. A multiple-image formation layer is stacked on the second surface of the spacer layer. The line tone barrier layer includes first regions, which transmit electromagnetic waves in at least some wavelength ranges, and second regions, which absorb electromagnetic waves in at least some wavelength ranges. The second regions in a surface contacting the spacer layer have substantially the same width and shape, and the second regions are arranged at equal intervals sandwiching at least portions of the first regions to form a line tone pattern. The multiple-image formation layer includes images that are visible when observed from specific angles over the first regions of the line tone barrier. Each of the images includes a third region, which scatters electromagnetic waves in at least some wavelength ranges, and a fourth region, which absorbs electromagnetic waves in at least some wavelength ranges. The image is formed by a contrast resulting from an area ratio of the third region and the fourth region.

Another aspect of a multiple-image display body according to the present invention includes a spacer layer including a first surface and a second surface opposite to the first surface. The spacer layer has the form of a thin film. A line tone barrier layer is stacked on the first surface of the spacer layer. A multiple-image formation layer is stacked on the second surface of the spacer layer. An electromagnetic wave absorbing layer is stacked on a surface of the multiple-image formation layer opposite to the spacer layer. The line tone barrier layer includes first regions, which transmit electromagnetic waves in at least some wavelength ranges, and second regions, which absorb electromagnetic waves in at least some wavelength ranges. The second regions in a surface contacting the spacer layer have substantially the same width and shape, and the second regions are arranged at equal intervals sandwiching at least portions of the first regions to form a line tone pattern. The multiple-image formation layer includes images that are visible when observed from specific angles over the first regions of the line tone barrier. Each of the images includes a third region, which scatters electromagnetic waves in at least some wavelength ranges, and a fifth region, which transmits electromagnetic waves in at least some wavelength ranges. The image is formed by a contrast resulting from an area ratio of the third region and the fifth region. The electromagnetic wave absorbing layer absorbs electromagnetic waves transmitted in order from the line tone barrier to the spacer layer and then to the fifth region.

A further aspect of a multiple-image display body according to the present invention includes a spacer layer including a first surface and a second surface opposite to the first surface. The spacer layer has the form of a thin film. A line tone barrier layer is stacked on the first surface of the spacer layer. A multiple-image formation layer is stacked on the second surface of the spacer layer. An electromagnetic wave scattering layer is arranged on a surface of the multiple-image formation layer opposite to the spacer layer. The line tone barrier layer includes first regions, which transmit electromagnetic waves in at least some wavelength ranges, and second regions, which absorb electromagnetic waves in at least some wavelength ranges. The second regions in a surface contacting the spacer layer have substantially the same width and shape, and the second regions are arranged at equal intervals sandwiching at least portions of the first regions to form a line tone pattern. The multiple-image formation layer includes images that are visible when observed from specific angles over the first regions of the line tone barrier. Each of the images includes a sixth region, which absorbs electromagnetic waves in at least some wavelength ranges, and a seventh region, which transmits electromagnetic waves in at least some wavelength ranges. The image is formed by a contrast resulting from an area ratio of the sixth region and the seventh region. The electromagnetic wave scattering layer scatters electromagnetic waves transmitted in order from the line tone barrier to the spacer layer and then to the seventh region.

Preferably, the third region has a corrugated structure, and the corrugated structure includes recesses filled with electromagnetic wave scattering particles that scatter electromagnetic waves in at least some wavelength ranges.

Preferably, the fourth region has a corrugated structure, and the corrugated structure includes recesses filled with electromagnetic wave absorbing particles that absorb electromagnetic waves in at least some wavelength ranges.

Preferably, the sixth region has a corrugated structure, and the corrugated structure includes recesses filled with electromagnetic wave absorbing particles that absorb electromagnetic waves in at least some wavelength ranges.

Preferably, the particles which the recesses are filled with are at least one of pigments, dyes, and metal nanoparticles.

Preferably, the particles which the recesses are filled with are core shell particles including cores of fine pigments and shells of a thermoplastic or thermosetting resin.

Preferably, the third region includes a corrugated structure, which is undulated and has a scattering characteristic, and an electromagnetic wave reflection layer, which is arranged on a surface of the corrugated structure.

Preferably, the fourth region includes a corrugated structure, which is undulated and has an absorbing characteristic, and an electromagnetic wave reflection layer, which is arranged on a surface of the corrugated structure.

The present invention allows a sufficient display to be obtained even when the outermost layer is contaminated with a liquid and also allows for sufficient image recognition when observed with only reflection light.

DETAILED DESCRIPTION OF THE PREFERRED EMBODIMENTS

Embodiments of the present invention will now be described in detail with reference to the drawings.

First Embodiment

Figure 1:
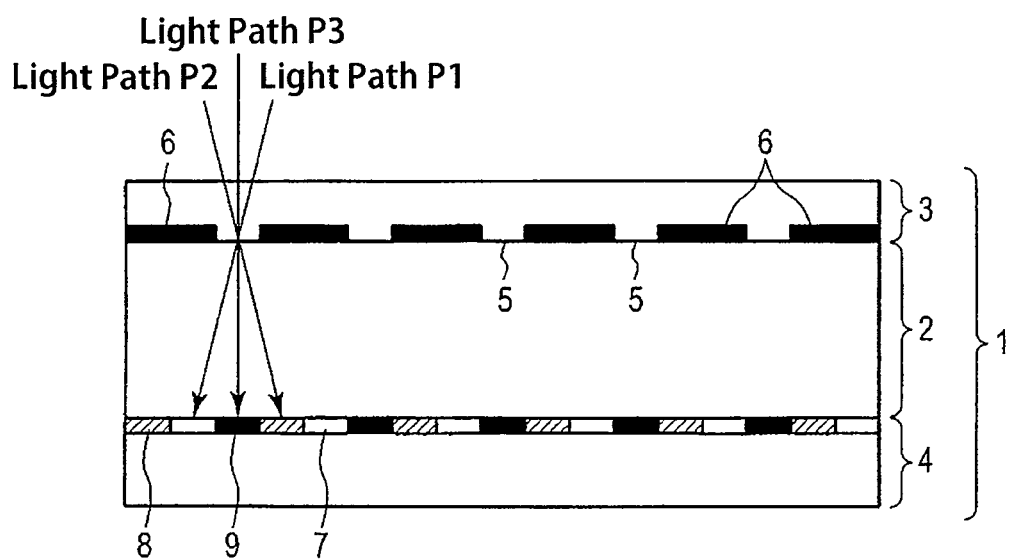
FIG. 1 is a cross-sectional view of a multiple-image display body according to a first embodiment of the present invention.

FIG. 1 is a cross-sectional view showing a first embodiment of a multiple-image display body according to the present invention.

A multiple-image display body 1 includes a spacer layer 2, which is a thin film, a line tone barrier layer 3, which is stacked on a first surface (upper surface) of the spacer layer 2, and a multiple-image formation layer 4, which is stacked on a second surface (lower surface) of the spacer layer 2.

The line tone barrier layer 3 includes first regions 5, which transmit at least some electromagnetic waves, and second regions 6, which have a predetermined thickness and absorb at least some electromagnetic waves. The first regions 5 and the second regions 6 are alternately arranged in a surface that contacts the spacer layer 2 to form a line tone pattern. In particular, the second regions 6 are rectangular and elongated in a direction orthogonal to the plane of FIG. 1. The second regions 6 have substantially the same width on the surface contacting the spacer layer 2. Further, the second regions 6 are arranged at equal intervals so as to sandwich at least part of the surface of each first region 5 that is in contact with the spacer layer 2. Thus, the second regions 6 form a line tone pattern. Each second region 6 has a quadrangular cross-section but is not necessarily limited to a quadrangular cross-section.

The multiple-image formation layer 4 includes "multiple images" on the surface joined with the second surface of the spacer layer 2. The multiple images are each visible when observed from a number of specified angles over the "first regions 5" of the line tone barrier layer 3. More specifically, three images, namely, a first image 7, a second image 8, and a third image 9, are alternately repeated and consolidated as a group of lines on planes extending orthogonal to the plane of FIG. 1.

The first image 7 is visible when observed along light path P1. The second image 8 is visible when observed along light path P2. The third image 7 is visible when observed along light path P3.

Figure 2:
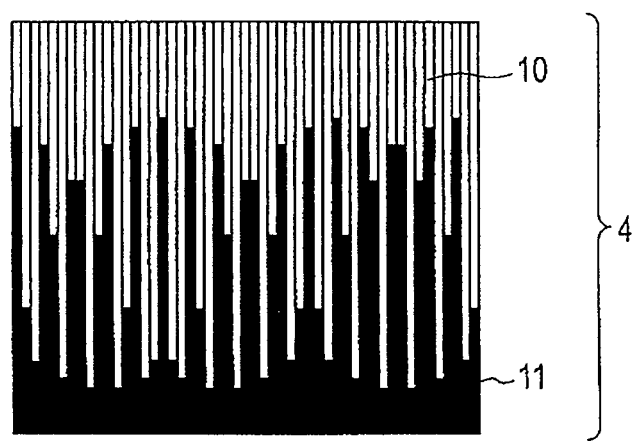
FIG. 2 is a front view of a multiple-image formation layer in the multiple-image display body shown in FIG. 1.

FIG. 2 is a front view of the multiple-image formation layer 4 shown in FIG. 1.

The multiple-image formation layer 4 is configured to form an image with the contrast obtained from the area ratio of a third region 10, which scatters electromagnetic waves in at least some of the wavelength ranges, and a fourth region 11, which absorbs electromagnetic waves in at least some of the wavelength ranges.

Figure 3A:
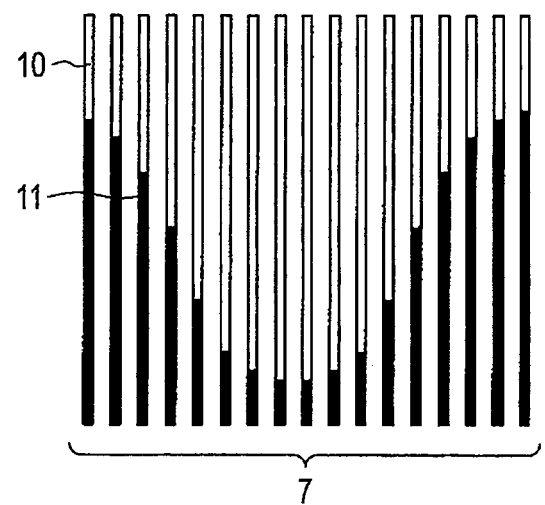
FIG. 3A is a front view of a first image arranged in the multiple-image formation layer shown in FIG. 2.
Figure 3B:
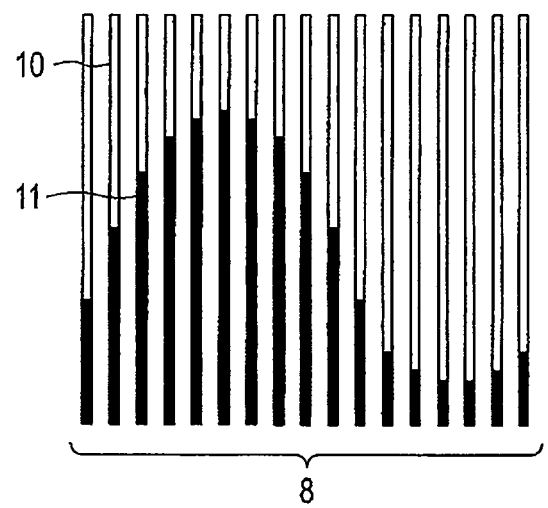
FIG. 3B is a front view of a second image arranged in the multiple-image formation layer shown in FIG. 2.
Figure 3C:
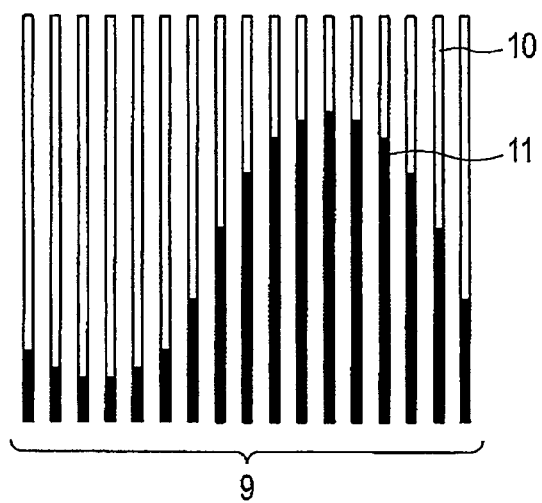
FIG. 3C is a front view of a third image arranged in the multiple-image formation layer shown in FIG. 2.

FIGS. 3A to 3C are front views of the first to third images 7 to 9 in the multiple-image formation layer 4. The first image 7, the second image 8, and the third image 9 are each formed by lines extending parallel to one another.

In the multiple-image formation layer 4 of FIG. 2, the lines forming the first image 7, the lines forming the second image 8, and the lines forming the third image 9 are alternately and repeatedly laid out so that the three images 7, 8, and 9 are consolidated as a group of lines. The three images 7, 8, and 9 may be separated as shown in FIGS. 3A to 3C. The first image 7, the second image 8, and the third image 9 each include the third region 10, which scatters electromagnetic waves in at least some wavelength ranges, and the fourth region 11, which absorbs electromagnetic waves in at least some wavelength ranges. Further, the first image 7, the second image 8, and the third image 9 are each formed by the contrast obtained from the area ratio of the third region 10 and the fourth region 11.

Figure 4:
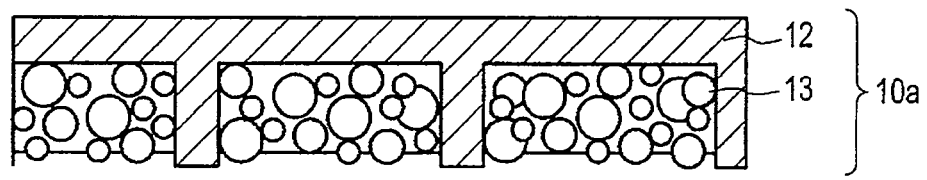
FIG. 4 is a cross-sectional view showing one example of a third region in the first, second, and third images of FIGS. 3A to 3C.

FIG. 4 is a cross-sectional view of a third region 10a and illustrates one example of the third region 10.

The third region 10a needs to function to scatter electromagnetic waves in at least some wavelength ranges. Thus, as shown in FIG. 4, the third region 10a has a corrugated structure 12 and includes electromagnetic wave scattering particles 13, which scatter electromagnetic waves. Recesses of the corrugated structure 12 are filled with the electromagnetic wave scattering particles 13.

The scattering of electromagnetic waves caused by the electromagnetic wave scattering particles 13 is classified in accordance with the size parameter into Rayleigh scattering, Mie scattering, and diffraction scattering. The size parameter distribution that is employed scatters the desired wavelength range in a desired manner.

Figure 5:
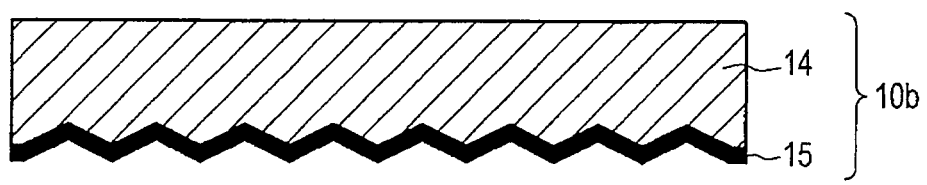
FIG. 5 is a cross-sectional view showing another example of the third region in the first, second, and third images of FIGS. 3A to 3C.

FIG. 5 is a cross-sectional view of a third region 10b illustrating another example of the third region 10. The third region 10b needs to function to scatter electromagnetic waves in at least some wavelength ranges. Thus, the third region 10b has a scattering corrugated structure 14, which is, for example, undulated, and an electromagnetic wave reflection layer 15, which is stacked on the surface of the corrugated structure 14.

Figure 6:
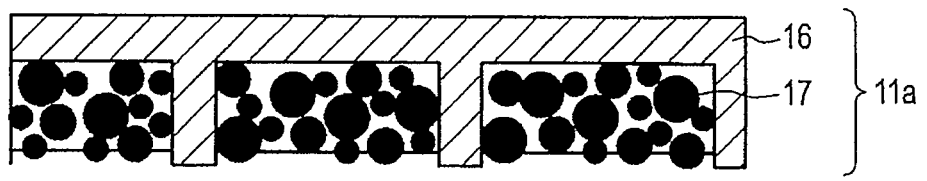
FIG. 6 is a cross-sectional view showing one example of a fourth region in the first, second, and third images of FIGS. 3A to 3C.

FIG. 6 is a cross-sectional view of a fourth region 11a illustrating one example of the fourth region 11.

The fourth region 11a needs to function to absorb electromagnetic waves in at least some wavelength ranges. Thus, the fourth region 11a includes a corrugated structure 16 and electromagnetic wave absorbing particles 17. Recesses of the corrugated structure 16 are filled with the electromagnetic wave absorbing particles 17.

The electromagnetic wave absorbing particles 17 may be selected from pigments, dyes, metal particles, and the like that absorb electromagnetic waves in the desired wavelength range.

Figure 7:
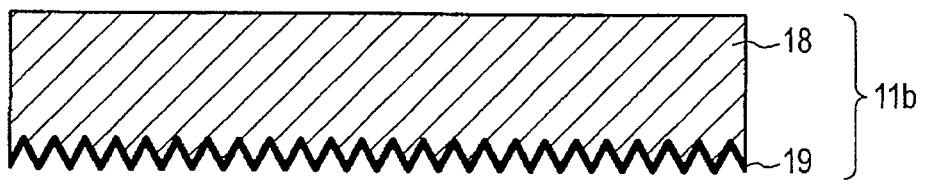
FIG. 7 is a cross-sectional view showing another example of the fourth region in the first, second, and third images of FIGS. 3A to 3C.

FIG. 7 is a cross-sectional view of a fourth region 11b illustrating another example of the fourth region 11.

The fourth region 11b needs to function to absorb electromagnetic waves in at least some wavelength ranges. Thus, the fourth region 11b includes a corrugated structure 18 having electromagnetic wave absorption characteristics, that is, a low reflective structure or a non-reflective structure. Further, the fourth region 11b includes an electromagnetic wave reflection layer 19 that is stacked on the surface of the corrugated structure 18.

Layers Forming Multiple-Image Display Body

Spacer Layer 2

The material forming the spacer layer 2 may be a plastic film of polyethylene terephthalate (PET), polyethylene naphthalate (PEN), triacetyl cellulose (TAC), vinyl chloride, polycarbonate, acrylic, polypropylene (PP), poly ethylene (PE), or the like. However, the spacer layer 2 is not limited to these materials. Further, the spacer layer 2 may be a film of a thermoplastic resin, a thermosetting resin, or an electromagnetic wave curable resin. The spacer layer 2 needs to function to send the light transmitted through the line tone barrier layer 3 to the multiple-image formation layer 4. Thus, it is desirable that the transparency of the spacer layer 2 be as high as possible. Further, the spacer layer 2 functions as a spacer that keeps a desired distance between the line tone barrier layer 3 and the multiple-image formation layer 4.

Line Tone Barrier Layer 3

In the line tone barrier layer 3, linear electromagnetic wave transmission regions (corresponding to first regions 5) and linear electromagnetic wave absorption regions (corresponding to second regions 6) are alternatively and continuously laid out on a plane. In the multiple-image formation layer 4, when n represents the width of each line forming a certain image, and m represents the number of images, the following expressions are satisfied.

line width of "electromagnetic wave absorption region" in line tone barrier layer $3 = (m-1) \times n$    (expression 1)

line width of "electromagnetic wave transmission region" in line tone barrier layer $3 = n$    (expression 2)

"thickness" of spacer layer $2 \geq mn$    (expression 3)

"image number" in multiple-image formation layer 4 required to show continuous change $\geq 3$    (expression 4)

When the four expressions are satisfied, the effect in which the images 7 to 9 change continuously may be obtained over the line tone barrier layer 3.

When the spacer layer 2 has a thickness that is greater than or equal to the line tone pitch of the "line tone barrier layer 3," the images 7 to 9 become visible at a slight angle of vision. This improves the visibility.

When the multiple-image display body is used as a security film watermarked on paper, the "thickness" of the spacer layer 2 obtained in expression 3 needs to be 50 μm or less and, further preferably, 25 μm or less. The thickness of a film watermarked on paper is related to the formation of creases during offset printing or intaglio printing during paper manufacturing or during a subsequent process. This affects the quality. Thus, it is preferred that the film be as thin as possible. In this case, however, high precision is required for the "line tone barrier layer 3" and the "images 7 to 9" to satisfy the four expressions.

For example, when the "thickness" of the spacer layer 2 is 25 μm and the "image number" is 3, that is, when m=3 and mn=25 μm are satisfied, n=8.3 μm is satisfied. Thus, the line width of the "electromagnetic wave absorption region" in the line tone barrier layer 3 obtained from expression 1 is 16.6 μm, and the line width of the "electromagnetic wave transmission region" in the line tone barrier layer 3 obtained from expression 2 is 8.3 μm. Further, the line width of each line forming any single image in the multiple-image formation layer 4 is 8.3 μm. Thus, high-contrast lines having a resolution of 8.3 μm is necessary in the line tone barrier layer 3 and the images 7 to 9.

Non-uniform transfer of a cell pattern shape during the transfer of ink, the blotting of ink, and the splattering of ink usually occur in offset printing, gravure printing, relief printing, inkjet printing, and the like. Thus, it is difficult to print such high-contrast lines with high precision.

Thus, in the "line tone barrier layer 3" and the "multiple-image formation layer 4" of the present invention, corrugated structures (e.g., corrugated structures 12 and 16) having accurate patterns are duplicated by imprinting highly precise pixels of 10 μm or less. Then, for example, the recesses of the corrugated structure are filled with the "electromagnetic wave scattering pigments" or "electromagnetic wave absorbing pigments."

When the "electromagnetic wave absorption region (second region)" of the line tone barrier layer 3 includes a metal reflection layer of aluminum or the like, it becomes difficult to view the reflection light of the images in the multiple-image formation layer 4 with the reflection light of the line tone barrier layer 3. Accordingly, the line tone of the line tone barrier layer 3 need to use structural color or pigment that absorbs electromagnetic waves.

Multiple-Image Formation Layer 4

In the multiple-image formation layer 4, the separated lines are consolidated. The images 7 to 9 are shown by the contrast obtained from the combination of the electromagnetic wave scattering regions and transmission regions, the combination of the electromagnetic wave absorption regions and transmission regions, or the combination of electromagnetic wave scattering regions and electromagnetic wave absorption regions.

Second Embodiment

Figure 8:
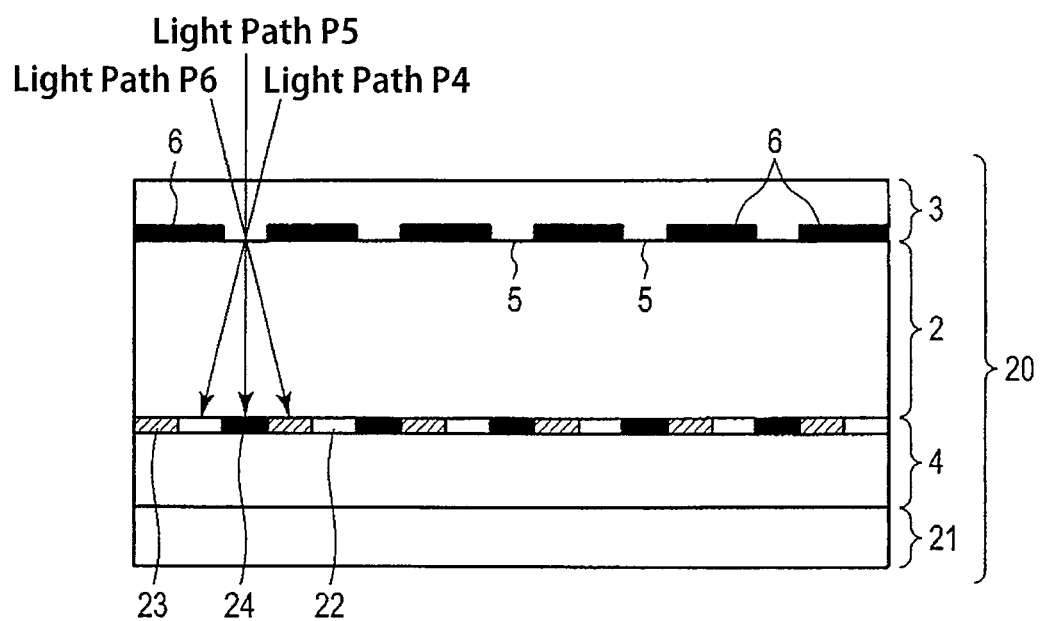
FIG. 8 is a cross-sectional view of a multiple-image display body according to a second embodiment of the present invention.

FIG. 8 is a cross-sectional view showing a second embodiment of a multiple-image display body according to the present invention.

A multiple-image display body 20 includes the spacer layer 2, the line tone barrier layer 3, which is stacked on the first surface of the spacer layer 2, and the multiple-image formation layer 4 and an electromagnetic wave absorbing layer 21, which are sequentially stacked on the second surface (lower surface) of the spacer layer 2.

The line tone barrier layer 3 includes the first regions 5, which transmit at least some electromagnetic waves, and the second regions 6, which absorb at least some electromagnetic waves. The second regions 6 are rectangular and elongated in a direction orthogonal to the plane of FIG. 8. The second regions 6 have substantially the same width on the surface contacting the spacer layer 2. Further, the second regions 6 are arranged at equal intervals so as to sandwich at least part of the surface of each first region 5 that is in contact with the spacer layer 2. Thus, the second regions 6 form a line tone pattern. That is, the first regions 5 and the second regions 6 are alternately arranged on the surface that contacts the spacer layer 2 to form a line tone pattern.

The multiple-image formation layer 4 includes "multiple images" on the surface joined with the second surface of the spacer layer 2. The multiple images are each visible when observed from a number of specified angles over the "first regions 5" of the line tone barrier layer 3. More specifically, three images, namely, a first image 22, a second image 23, and a third image 24, are alternately repeated and consolidated as a group of lines on planes extending orthogonal to the plane of FIG. 8.

The first image 22 is visible when observed along light path P4. The second image 23 is visible when observed along light path P6. The third image 24 is visible when observed along light path P5.

The layers 2, 3, and 4 of the multiple-image display body 20 in the second embodiment have been described in detail in the first embodiment and thus will not be described below.

It is preferred that the electromagnetic wave absorbing layer 21 include a corrugated structure that absorbs electromagnetic waves or include electromagnetic wave absorbing particles as described above. The electromagnetic wave absorbing layer 21 absorbs electromagnetic waves transmitted through the multiple-image formation layer 4.

Figure 9:
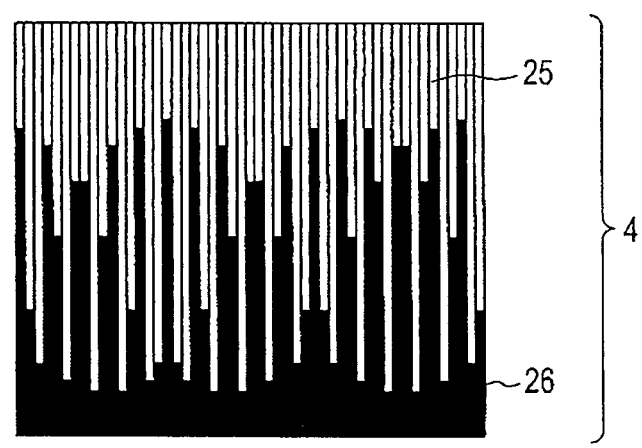
FIG. 9 is a front view of a multiple-image formation layer in the multiple-image display body shown in FIG. 8.

FIG. 9 is a front view of the multiple-image formation layer 4 shown in FIG. 8.

The multiple-image formation layer 4 forms an image with the contrast obtained from the area ratio of a third region 25, which scatters electromagnetic waves in at least some of the wavelength ranges, and a fifth region 26, which transmits electromagnetic waves in at least some of the wavelength ranges.

Figure 10A:
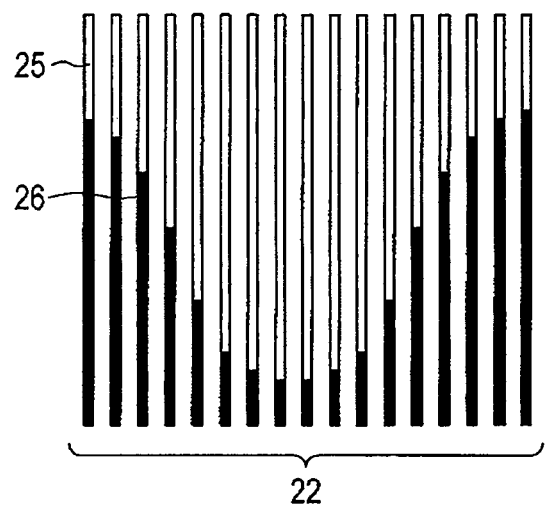
FIG. 10A is a front view of a first image arranged in the multiple-image formation layer shown in FIG. 9.
Figure 10B:
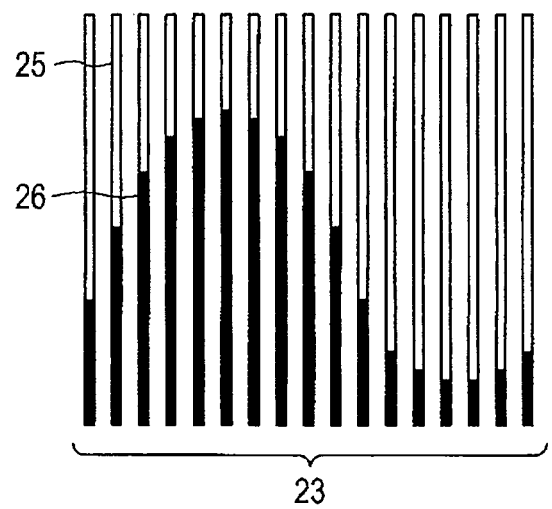
FIG. 10B is a front view of a second image arranged in the multiple-image formation layer shown in FIG. 9.
Figure 10C:
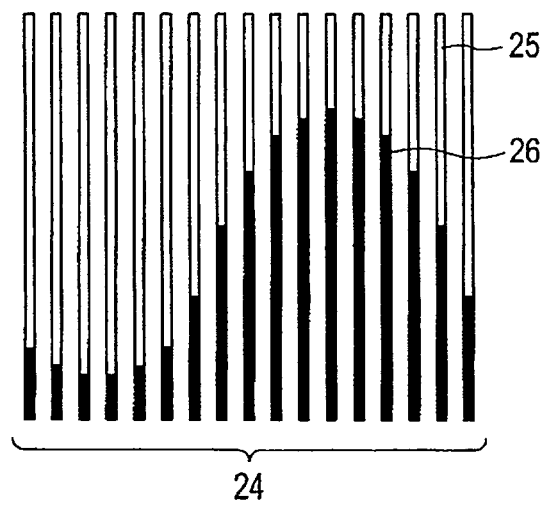
FIG. 10C is a front view of a third image arranged in the multiple-image formation layer shown in FIG. 9.

FIGS. 10A to 10C are front views of the three images 22 to 24 in the multiple-image formation layer 4. The first image 22, the second image 23, and the third image 24 are each formed by lines extending parallel to one another.

In the multiple-image formation layer 4 of FIG. 9, the lines forming the first image 22, the lines forming the second image 23, and the lines forming the third image 24 are alternately and repeatedly laid out so that the three images are consolidated as a group of lines. The three images 22, 23, and 24 may be separated as shown in FIGS. 10A to 10C. The first image 22, the second image 23, and the third image 24 each include the third region 25, which scatters electromagnetic waves in at least some wavelength ranges, and the fifth region 26, which transmits electromagnetic waves in at least some wavelength ranges. An image is formed with the contrast obtained from the area ratio of the third region 25 and the fifth region 26.

Figure 11:
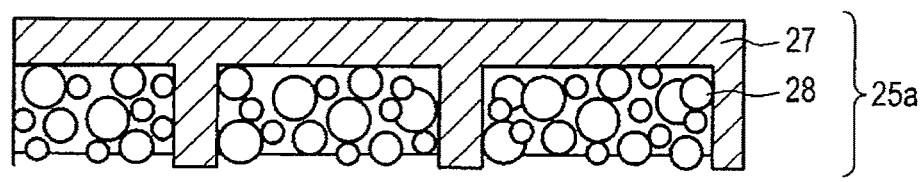
FIG. 11 is a cross-sectional view showing one example of a third region in the first, second, and third images of FIGS. 10A to 10C.

FIG. 11 is a cross-sectional view of a third region 25a and illustrates one example of the third region 25.

The third region 25a needs to function to scatter electromagnetic waves in at least some wavelength ranges. Thus, the third region 25a has a corrugated structure 27 and includes electromagnetic wave scattering particles 28. Recesses of the corrugated structure 27 are filled with the electromagnetic wave scattering particles 28.

The scattering of electromagnetic waves caused by the electromagnetic wave scattering particles 28 is classified in accordance with the size parameter into Rayleigh scattering, Mie scattering, and diffraction scattering. The size parameter distribution that is employed scatters the desired wavelength range in a desired manner.

Figure 12:
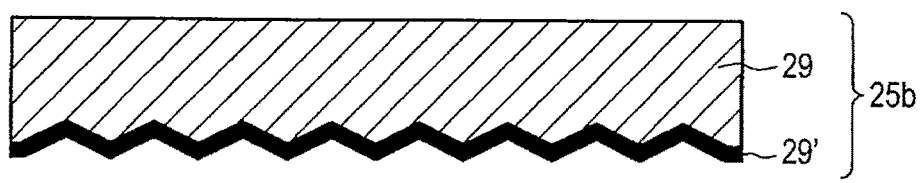
FIG. 12 is a cross-sectional view showing another example of the third region in the first, second, and third images of FIGS. 10A to 10C.

FIG. 12 is a cross-sectional view of a third region 25b illustrating another example of the third region 25. The third region 25b needs to function to scatter electromagnetic waves in at least some wavelength ranges. Thus, the third region 25b has a scattering corrugated structure 29, which is, for example, undulated, and an electromagnetic wave reflection layer 29', which is stacked on the surface of the corrugated structure 29.

Third Embodiment

Figure 13:
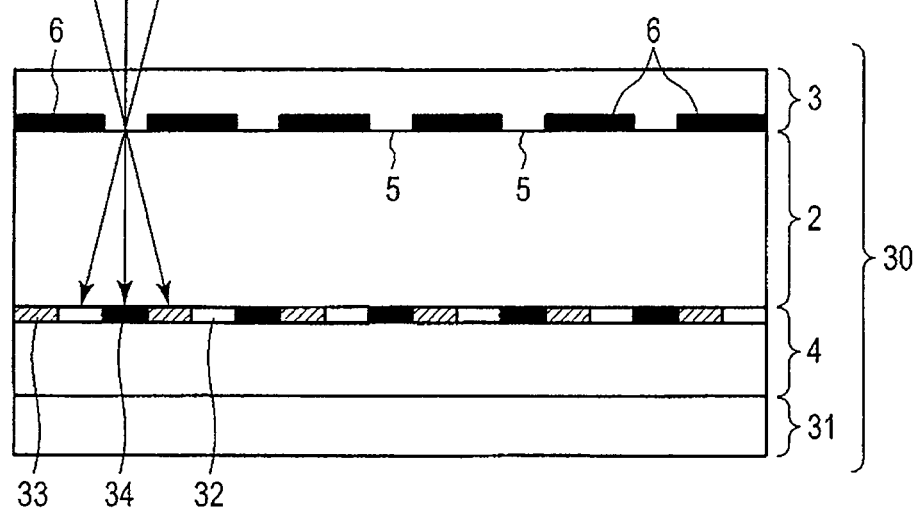
FIG. 13 is a cross-sectional view of a multiple-image display body according to a third embodiment of the present invention.

FIG. 13 is a cross-sectional view showing a third embodiment of a multiple-image display body according to the present invention.

A multiple-image display body 30 includes the spacer layer 2, the line tone barrier layer 3, which is stacked on the first surface of the spacer layer 2, and the multiple-image formation layer 4 and an electromagnetic wave scattering layer 31, which are sequentially stacked on the second surface (lower surface) of the spacer layer 2.

The line tone barrier layer 3 includes the first regions 5, which transmit at least some electromagnetic waves, and the second regions 6, which absorb at least some electromagnetic waves. The second regions 6 are rectangular and elongated in a direction orthogonal to the plane of FIG. 13. The second regions 6 have substantially the same width on the surface contacting the spacer layer 2. Further, the second regions 6 are arranged at equal intervals so as to sandwich at least part of the surface of each first region 5 that is in contact with the spacer layer 2. Thus, the second regions 6 form a line tone pattern. That is, the first regions 5 and the second regions 6 are alternately arranged on the surface that contacts the spacer layer 2 to form a line tone pattern. Each second region 6 has a quadrangular cross-section but is not necessarily limited to a quadrangular cross-section.

The multiple-image formation layer 4 includes "multiple images" on the surface joined with the second surface of the spacer layer 2. The multiple images are each visible when observed from a number of specified angles over the "first regions 5" of the line tone barrier layer 3. More specifically, three images, namely, a first image 32, a second image 33, and a third image 34, are alternately repeated and consolidated as a group of lines on planes extending orthogonal to the plane of FIG. 13.

The first image 32 is visible when observed along light path P7. The second image 33 is visible when observed along light path P9. The third image 34 is visible when observed along light path P8.

The layers 2, 3, and 4 of the multiple-image display body 30 in the third embodiment have been described in detail in the first embodiment and thus will not be described below.

It is preferred that the electromagnetic wave scattering layer 31 include a corrugated structure that scatters electromagnetic waves or include electromagnetic wave scattering particles as described above. The electromagnetic wave scattering layer 31 scatters electromagnetic waves transmitted through the multiple-image formation layer 4.

Figure 14:
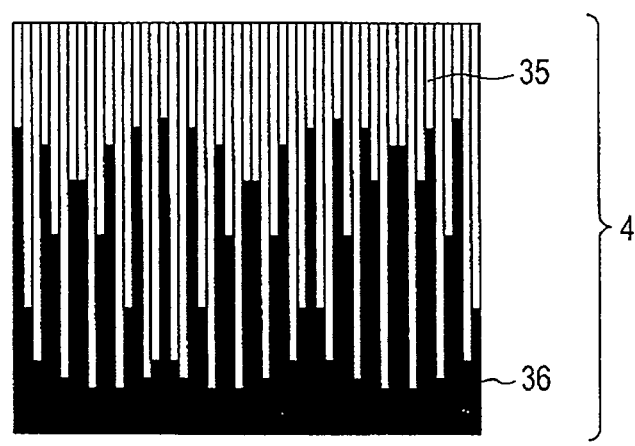
FIG. 14 is a front view of a multiple-image formation layer in the multiple-image display body shown in FIG. 13.

FIG. 14 is a front view of the multiple-image formation layer 4 shown in FIG. 13.

The multiple-image formation layer 4 forms an image with the contrast obtained from the area ratio of a sixth region 35, which absorbs electromagnetic waves in at least some of the wavelength ranges, and a seventh region 36, which transmits electromagnetic waves in at least some of the wavelength ranges.

Figure 15A:
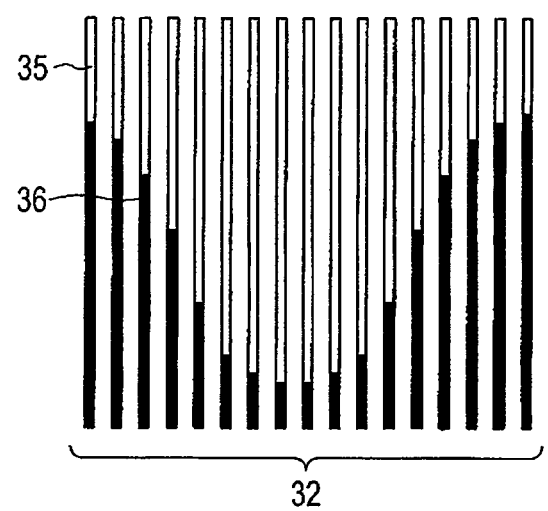
FIG. 15A is a front view of a first image arranged in the multiple-image formation layer shown in FIG. 14.
Figure 15B:
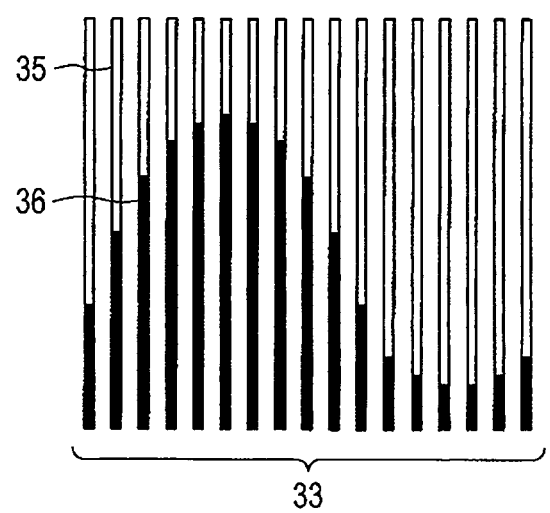
FIG. 15B is a front view of a second image arranged in the multiple-image formation layer shown in FIG. 14.
Figure 15C:
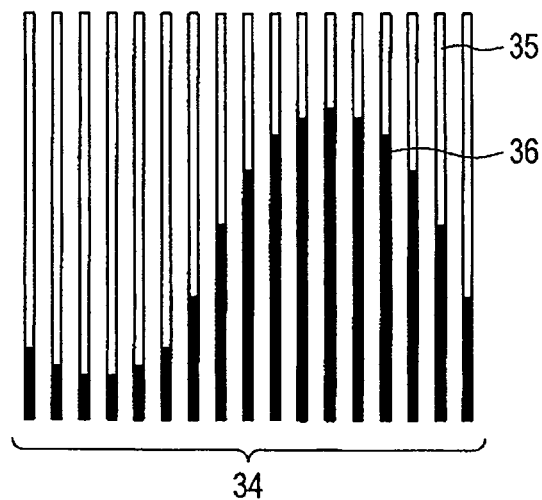
FIG. 15C is a front view of a third image arranged in the multiple-image formation layer shown in FIG. 14.

FIGS. 15A to 15C are front views of the three images 32 to 34 in the multiple-image formation layer 4. The first image 32, the second image 33, and the third image 34 are each formed by lines extending parallel to one another.

In the multiple-image formation layer 4 of FIG. 14, the lines forming the first image 32, the lines forming the second image 33, and the lines forming the third image 34 are alternately and repeatedly laid out so that the three images are consolidated as a group of lines. The three images 32, 33, and 34 may be separated as shown in FIGS. 15A to 15C. The first image 32, the second image 33, and the third image 34 each include the sixth region 35, which absorbs electromagnetic waves in at least some wavelength ranges, and the seventh region 36, which transmits electromagnetic waves in at least some wavelength ranges. An image is formed with the contrast obtained from the area ratio of the sixth region 35 and the seventh region 36.

Figure 16:
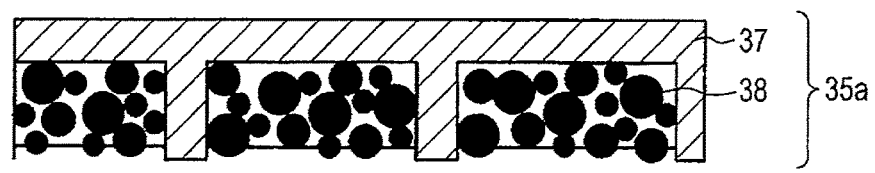
FIG. 16 is a cross-sectional view showing one example of a sixth region in the first, second, and third images of FIGS. 15A to 15C.

FIG. 16 is a cross-sectional view of a sixth region 35a illustrating one example of the sixth region 35.

The sixth region 35a needs to function to absorb electromagnetic waves in at least some wavelength ranges. Thus, the sixth region 35a includes a corrugated structure 37 and electromagnetic wave absorbing particles 38. Recesses of the corrugated structure 37 are filled with the electromagnetic wave absorbing particles 38.

The electromagnetic wave absorbing particles 38 may be selected from pigments, dyes, metal particles, and the like that absorb electromagnetic waves in the desired wavelength range.

Figure 17:
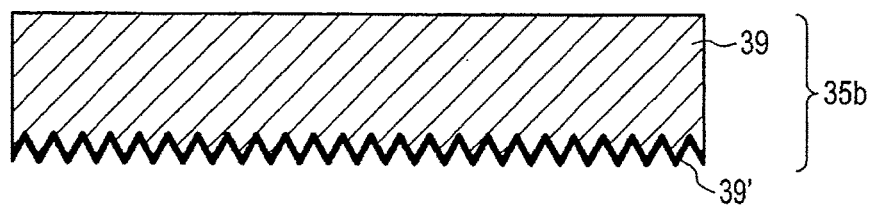
FIG. 17 is a cross-sectional view showing another example of the sixth region in the first, second, and third images of FIGS. 15A to 15C.

FIG. 17 is a cross-sectional view of a sixth region 35b illustrating another example of the sixth region 35. The sixth region 35b needs to function to absorb electromagnetic waves in at least some wavelength ranges. Thus, the sixth region 35b includes a corrugated structure 39 having electromagnetic wave absorption characteristics, that is, a low reflective structure or a non-reflective structure. Further, the sixth region 35b includes an electromagnetic wave reflection layer 39' that is stacked on the surface of the corrugated structure 39.

FIGS. 18A to 18D are schematic diagrams showing how a multiple-image display according to the present invention is observed.

Figure 18A:
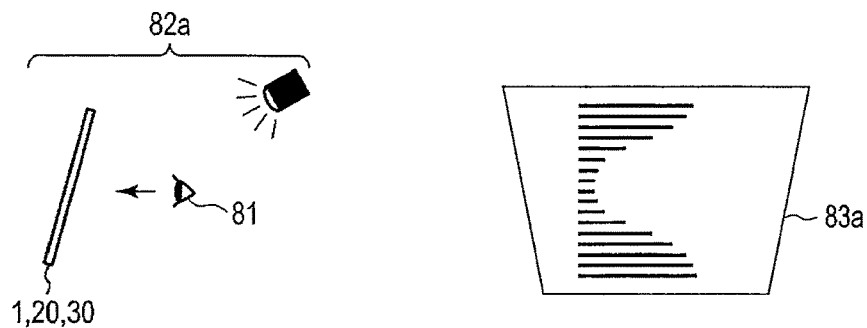
FIG. 18A is a schematic diagram showing the characteristics of a multiple-image display body according to the present invention.

First, referring to FIG. 18A, an observation condition 82a is set in which the multiple-image display bodies 1, 20, and 30 are slightly tilted toward an observation side from a direction orthogonal to a horizontal line of sight of an observer 81. Under this observation condition 82a, the observer 81 observes a first image 83a, which is shown at the right side of the drawing, from the line tone barrier layer 3.

Figure 18B:
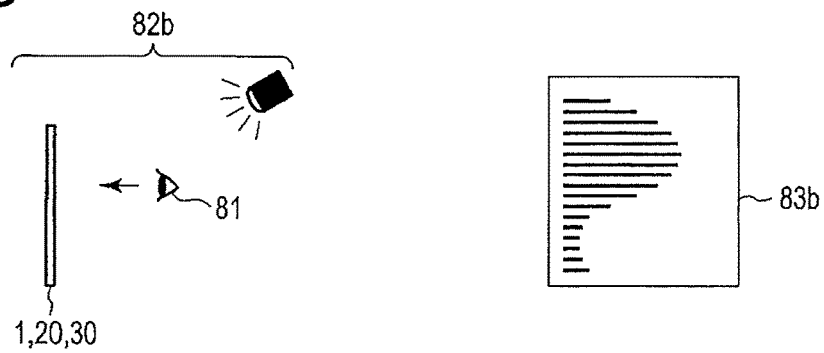
FIG. 18B is a schematic diagram showing the characteristics of a multiple-image display body according to the present invention.

Then, referring to FIG. 18B, an observation condition 82b is set in which the multiple-image display bodies 1, 20, and 30 are arranged in a direction orthogonal to a horizontal line of sight of the observer 81. Under this observation condition 82b, the observer 81 observes a second image 83b, which is shown at the right side of the drawing, from the line tone barrier layer 3.

Figure 18C:
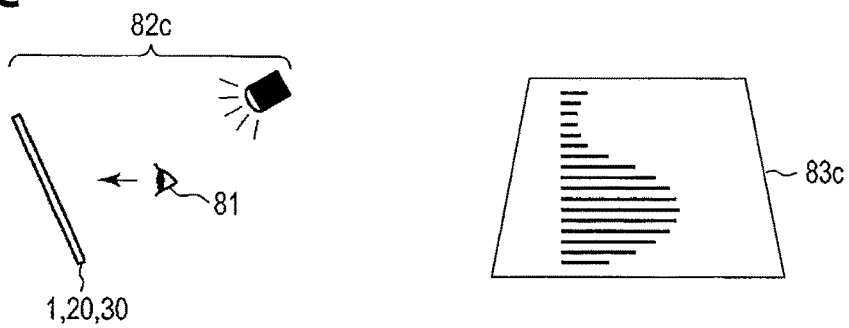
FIG. 18C is a schematic diagram showing the characteristics of a multiple-image display body according to the present invention.

Further, referring to FIG. 18C, an observation condition 82c is set in which the multiple-image display bodies 1, 20, and 30 are slightly tilted away from the observation side in a direction orthogonal to a horizontal line of sight of the observer 81. Under this observation condition 82b, the observer 81 observes a third image 83c, which is shown at the right side of the drawing, from the line tone barrier layer 3.

Figure 18D:
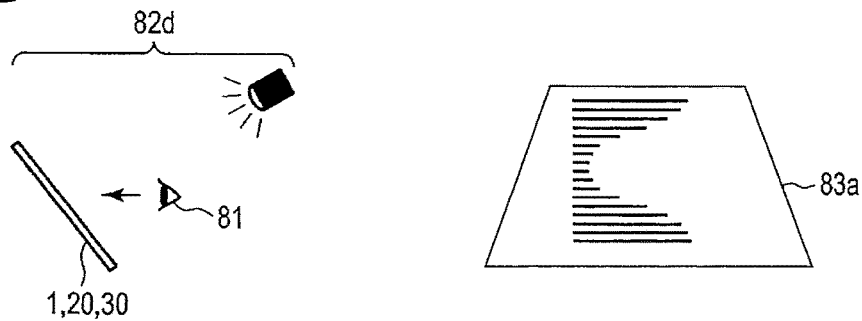
FIG. 18D is a schematic diagram showing the characteristics of a multiple-image display body according to the present invention.

Further, referring to FIG. 18D, an observation condition 82d is set in which the multiple-image display bodies 1, 20, and 30 are almost laid down away from the observation side in a direction orthogonal to a horizontal line of sight of the observer 81. Under this observation condition 82d, the observer 81 observes the first image 83a, which is shown at the right side of the drawing, from the line tone barrier layer 3.

A change in the observation angle of the multiple-image display bodies 1, 20, and 30 changes the image. This allows for the observation of changes in an image including continuous movement.

Layer structure, used material, and manufacturing method of multiple-image display bodies 1, 20, and 30

Details of method for forming corrugated structure filled with electromagnetic wave scattering particles or electromagnetic wave absorbing particles Representative processes for continuously duplicating vast amounts of molded resin products having corrugated patterns that form the corrugated structures 12, 16, 27, and (hereafter, referred to as the corrugated structure 12 for the sake of brevity) include a "hot embossing process," "casting process," "photopolymer process," and the like.

Among these processes, the "photopolymer process" (2P process, photosensitive resin process) is a process that pours radiation-curable resin into between a relief mold (duplication mold of fine corrugated pattern) and a flat base material (plastic film etc.), cures the radiation-curable resin, and then removes the cured film together with a substrate from the duplication mold. This obtains a highly precise fine corrugated pattern. Further, an optical element obtained through such a process has a better corrugated pattern molding accuracy than a "pressing process" or a casting process" that use thermoplastic resin and has superior heat resistance and chemical resistance. New manufacturing methods also include a process that performs molding using a solid or highly viscous photo-curable resin under normal temperatures or a process that adds a release agent.

Examples of materials used to form the corrugated structure 12 include a sole material or a composite material of a thermoplastic resin such as an acrylic resin, an epoxy resin, a cellulose resin, and a vinyl resin; and a thermoset resin such as an urethane resin in which polyisocyanate is added and cross-linked as a cross-linking agent to acrylic polyol, polyester polyol, or the like that have a hydroxyl group, a melamine resin, an epoxy resin, and a phenol resin. As long as the corrugated structure 12 can be formed, materials other than those listed above may be used.

Materials of the corrugated structure 12 used in the photopolymer process include monomer, oligomer, polymer, and the like that have an ethylene unsaturated bond or an ethylene non-saturated group. Examples of a monomer include 1,6-hexane diol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of an oligomer include epoxy acrylate, urethane acrylate, and polyester acrylate. Examples of a polymer include a urethane modified acrylic resin and an epoxy modified acrylic although there is no limitation to such substances.

When employing light cationic polymerization, a monomer, an oligomer, and a polymer that include an epoxy group; a compound containing an oxetane frame; and a vinyl ether may be used. When curing the ionizing radiation-curable resin with light such as ultraviolet rays, a photopolymerization initiator may be added. In accordance with the resin, a light radical polymerization initiator, a light cationic polymerization initiator, or a combination (hybrid) of these initiators may be selected.

Further, a mixture of a monomer, an oligomer, a polymer, and the like having an ethylene unsaturated bond or an ethylene non-saturated group may be used; a reactive group may be prepared in these substances and these substances may be cross-linked with each other using an isocyanate compound, a silane coupling agent, an organic titanate cross-linking agent, an organozirconium cross-linking agent, organic aluminate, or the like; and a reactive group may be prepared in these substances and these substances may be cross-linked with other resin frames using an isocyanate compound, a silane coupling agent, an organic titanate cross-linking agent, an organozirconium cross-linking agent, organic aluminate, or the like. With such a method, an ethylene unsaturated bond or an ethylene non-saturated group exists as a solid under normal temperatures and has few tucks. This allows for a polymer to be obtained having good molding characteristics and a relatively clean original plate.

Examples of a light radical polymerization initiator include a benzoin compound such as benzoin, benzoinmethylether, and benzoinethylether; a anthraquinone compound such as anthraquinone and methylanthraquinone; a phenyl ketone compound such as acetophenone, diethoxyacetophenone, benzophenone, hydroxyacetophenone, 1-hydroxycyclohexyl phenyl ketone, α-aminoacetophenone, and 2-methyl-1-(4-methylthiophenyl)-2-morpholinopropane-1-one; benzil dimethyl ketal; thioxanthone; acyl phosphine oxide; and Michler's ketone.

The light cationic polymerization initiator when using a compound that can undergo light cationic polymerization may be aromatic diazonium salt, aromatic iodonium salt, aromatic sulfonium salt, aromatic phosphonium salt, mixed ligand metal salt, and the like. When light radical polymerization and light cationic polymerization are combined in a hybrid material, the polymerization initiator for each polymerization may be used in combination. Further, aromatic iodonium salt, aromatic sulfonium salt, and the like that function to start both polymerization with a single initiator may be used.

The compounding ratio of a radiation-curable resin and a light polymerization initiator is generally 0.1 to 15 mass % but may be set in accordance with the material. For a resin composition, a sensitizing dye may be further used in combination with the light polymerization agent. Further, when necessary, dye, pigment, various types of additives (polymerization inhibitor, leveling agent, defoamer, sagging agent, adhesion improving agent, coating surface modifier, plasticizer, nitrogen-containing compounds, etc.) and a cross-linking agent (e.g., epoxy resin) may be included. Further, to improve the molding characteristics, a non-reactive resin (including the thermoplastic resin and the thermosetting resin described above) may be added.

Further, the material that is selected may be one that can be molded in the employed manufacturing method, has a certain degree of fluidity, and is able to obtain a molded film having the desired heat resistance and chemical resistance.

A coating process may be employed for a layer that forms the corrugated structure 12 (hereafter referred to as the corrugated structure formation layer). In such a case, a support base material may be coated with the material of the "corrugated structure formation layer." In particular, the application of a wet coating would lower costs. Further, a coating diluted with a solvent that adjusts the thickness of the applied film may be applied and dried.

The preferred support base material is a film base material. For example, a plastic film such as polyethylene terephthalate (PET), polyethylene naphthalate (PEN), and polypropylene (PP) may be used. It is preferred that deformation and modification caused by heat, pressure, and electromagnetic waves be small in the material used when molding a fine corrugated pattern. Paper, synthesized paper, plastic multiple-layer paper, resin-impregnated paper, or the like may be used as the support base material when necessary.

The "corrugated structure formation layer" has a thickness that is 1.5 to 10 times greater than the depth of the recesses in the corrugated structure 12, and more preferably, 2 to 5 times greater than the depth. Depending on the manufacturing method, an excessively thick applied film may result in resin being squeezed out or creased when pressurized. When the thickness is too small, the fluidity would be poor and sufficient molding would be hindered.

The "depth of the recesses in the corrugated structure 12" may be selected in accordance with the diameter of the desired filling particles. The recess has a depth that is preferably 1 to 10 times greater than the maximum diameter of the filling particles. The thickness of the "corrugated structure formation layer" prior to the formation of the corrugated structure 12 is preferably 1.5 to 10 times greater than the "depth of the recesses," and more preferably, 2 to 5 times greater than the thickness of the "depth of the recesses."

After the obtained "corrugated structure formation layer" comes into contact with a "relief original plate," on which a relief shape having the desired corrugated structure is formed, the shape of the relief original plate is transferred to one side of the fine corrugated structure formation layer using heat, pressure, and electromagnetic waves when necessary. The relief shape may be formed on opposite sides of the "corrugated structure formation layer."

The relief original plate may be formed through a known method. When the relief original plate is of a roll type, continuous molding may be performed.

Details of Process for Filling Corrugated Structure with Particles

After forming the corrugated structure 12 in which one side of the corrugated structure formation layer is filled with particles, the entire surface of the corrugated structure 12 is coated with a diluted solution of the filling particles. Here, when the particles need to be fixed, a binder, which is soluble in the diluted solution, may be added. The used binder may be any one of a thermoplastic resin, a thermal-curable resin, and an electromagnetic wave-curable resin or a mixture of these resins.

Then, wiping is performed with an air knife, a doctor, or a squeegee to fill only the recesses of the corrugated structure 12 with particles. The solvent using for the diluted solution of particles may be volatilized, and the binder may be hardened by applying heat or irradiating electromagnetic waves.

Details of Process for Forming Corrugated Structure 14 Having Electromagnetic Wave Scattering Function The corrugated structure 14 has an electromagnetic wave scattering function and scatters electromagnetic waves. The electromagnetic wave scattering performed by the corrugated structure 14 is in accordance with the corrugation cycle. When the corrugated structure has a fixed corrugation cycle, the scattering strength increases in a specific direction during diffraction scattering. However, the corrugated structure has a directivity that greatly decreases the scattering strength in a specific direction. This is not suitable for a multiple-image display body according to the present invention.

In a corrugated structure having a random cycle in a range of approximately 1.0 to 10 times greater than the wavelength of the scattered electromagnetic waves and a cycle having a random directivity on a plane, electromagnetic waves of any incident angle (electromagnetic waves in any wavelength range) has a feature in that the scattering relative to the plane is isotropic (semispherical scattering relative to incident point). This is preferable for the corrugated structure 14.

The process for forming a corrugated structure 14 having an electromagnetic wave scattering function is the same in detail as the process for forming the corrugated structure filled with the electromagnetic wave scattering particles or the electromagnetic wave absorbing particles. That is, a process that embosses an original plate including a corrugated structure having the scattering characteristics enables for the formation of the corrugated structure 14 having an electromagnetic wave scattering function.

Details of Process for Forming Corrugated Structure (e.g., Corrugated Structure 18) Having Electromagnetic Wave Absorbing Function A corrugated structure having an electromagnetic wave absorbing function absorbs electromagnetic waves. Generally, a diffraction grating having a shorter cycle than the wavelength of the electromagnetic wave that is to be absorbed obtains a corrugated structure having an electromagnetic wave absorbing function. A structure known as a subwavelength grating has an effect that encloses electromagnetic waves and thus can be used as an electromagnetic wave absorptive corrugated structure in the present invention.

Further, a high aspect, fly's eye non-reflection structure may also be used as an electromagnetic wave absorptive corrugated structure in the present invention.

The process for forming a corrugated structure having an electromagnetic wave absorbing function is the same in detail as the process for forming the corrugated structure filled with the electromagnetic wave scattering particles or the electromagnetic wave absorbing particles. That is, a process that embosses an original plate including a corrugated structure having the scattering characteristics allows for the formation of a corrugated structure having an electromagnetic wave absorbing function.

Electromagnetic Wave Scattering Particles 13

When adding a binder to particles or when containing particles in specific resin layers, if there is a difference between the refractive index of the particles and the refractive index of the binder or between the refractive index of the particles and the refractive index of the resin layer holding the particles, a scattering characteristic is obtained at the interface of the particles and the binder or the resin. This scatters electromagnetic waves. The preferred difference in the refractive index in this case is 0.2 or greater. Scattering occurs when the difference in the refractive index is 0.2 or greater. The particles may be air or gas. The difference in the refractive index also causes scattering when the resin includes fine air bubbles or gas bubbles.

The scattering of electromagnetic waves caused by the particles is classified in accordance with the size parameter into Rayleigh scattering, Mie scattering, and diffraction scattering. The size parameter distribution that is employed scatters the desired wavelength range in a desired manner.

Electromagnetic Wave Reflection Layers 15, 19, 29', and 39'

The electromagnetic wave reflection layers 15, 19, 29', and 39' arranged along the corrugated surface of the electromagnetic wave scattering corrugated structures 14 and 29 and the electromagnetic wave absorbing corrugated structures 18 and 39 have electromagnetic wave reflection characteristics. When reflecting light, a material having a refractive index that is higher than the refractive index of the resin layer that forms the corrugated structure may be used. When the difference in the refraction index is 0.2 or greater, refraction and reflection occur at the interface of the "corrugated structure formation layer" and the "reflective layers 15, 19, 29', and 39'.

Examples of the material of a reflection film include metal materials such as Al, Sn, Cr, Ni, Cu, Au, and Ag used solely or in combination as a compound.

The reflection layers 15, 19, 29', and 39' need to be formed as thin layers having a uniform surface density on a plane of a fine corrugation formation layer. Thus it is preferred that the reflection layers 15, 19, 29', and 39' be formed through a dry coating process. For example, a known process such as a vacuum deposition process, a sputtering process, and a CVD process may be employed.

Further, examples of materials that may be used as the transparent reflection layers 15, 19, 29', and 39' are listed below. The numeric value in the parenthesis following the chemical formula or the compound name indicates the refractive index n. Examples of ceramics include $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5), $WO_3$ (5), SiO (5), $Si_2O_3$ (2.5), $In_2O_3$ (2.0), PbO (2.6), $Ta_2O_3$ (2.4), ZnO (2.1), $ZrO_2$ (5), MgO (1), $SiO_2$ (1.45), $Si_2O_2$ (10), $MgF_2$ (4), $CeF_3$ (1), $CaF_2$ (1.3 to 1.4), $AlF_3$ (1), $Al_2O_3$ (1), and GaO (2). Examples of organic polymers include polyethylene (1.51), polypropylene (1.49), polytetrafluoroethylene (1.35), polymethyl methacrylate (1.49), and polystyrene (1.60). However, there is no limitation to these compounds.

Protection layers (not shown) are formed on the reflection layers 15, 19, 29', and 39' when necessary. A protection layer needs to be a continuous film that is able to protect a reflection layer on an inclined surface where a reflection film remains. Further, it is preferred that a protection layer on a "surface where a reflection film is removed" be extremely thin with respect to the thickness of a protection layer on an "inclined surface where a reflection film remains."

Such a structure allows for the formation of an inclined "reflection film" in a process such as etching for removing the reflection layer.

Electromagnetic Wave Absorbing Particles 17

Examples of ceramics include $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (5), $WO_3$ (5), SiO (5), $Si_2O_3$ (2.5), $In_2O_3$ (2.0), PbO (2.6), $Ta_2O_3$ (2.4), ZnO (2.1), $ZrO_2$ (5), MgO (1), $SiO_2$ (1.45), $Si_2O_2$ (10), $MgF_2$ (4), $CeF_3$ (1), $CaF_2$ (1.3 to 1.4), $AlF_3$ (1), $Al_2O_3$ (1), and GaO (2). Examples of organic polymers include polyethylene (1.51), polypropylene (1.49), polytetrafluoroethylene (1.35), polymethyl methacrylate (1.49), and polystyrene (1.60). However, there is no limitation to these compounds.

The electromagnetic wave absorbing particles 17 may be a metal oxide, such as iron oxide or tin oxide, or metal nanoparticles that generate plasma oscillation. Further, general colorant pigments and colorant dyes also have characteristics in which they absorb specific wavelengths.

The above materials may be mixed and combined. Further, plural types of different particles may be used in any region.

In the multiple-image display body configured as described above, even when the outermost line tone barrier layer 3 is contaminated with a liquid such as oil or a chemical, there is no loss in the desired continuous movement and depth in a multiple-image display. Further, the contrast of the light intensity of the line tone barrier layer 3 and the multiple-image formation layer 4 is improved, and a high contrast can be obtained from any observation angle. Thus, an image can be recognized with high visibility under an observation condition in which there is only reflection light.

EXAMPLES

Examples of multiple-image display bodies according to the present invention will now be described.

Example 1

An ink composition of a "corrugated structure formation layer" such as that described below was prepared to form a corrugated structure of a line tone barrier layer 3 in a multiple-image display body according to the present invention through a photopolymer process.

"Corrugated structure formation layer ink composition" (ultraviolet-curable resin)

Urethane (meth)acrylate (polyfunctional, molecular weight 6,000) 50.0 parts by weight Methyl ethyl ketone 30.0 parts by weight Ethyl acetate 20.0 parts by weight Photoinitiator (IRGACURE 184 manufactured by Ciba Specialty) 1.5 parts by weight A roll photopolymer process was employed as a method for forming a corrugated structure on a corrugated structure formation layer.

Gravure printing was performed to apply an "ink composition of a fine corrugated structure formation layer," with a thickness of 5 μm when dried, to a support base material formed by a transparent polyethylene terephthalate (PET) film having a thickness of 23 μm. Then, a tubular original plate having a corrugated structure was pressed against the surface to which the ink composition was applied to perform molding under a pressing pressure of 2 Kgf/cm², a pressing temperature of 80° C., and a pressing speed of 10 m/min.

At the same time as when the molding was performed, ultraviolet exposure was performed at 300 mJ/cm² with a high-pressure mercury lamp over the support base material formed by a PET film. This transcribed the corrugated shape on the original plate to the "corrugated structure formation layer" and simultaneously cured the transcription. The "corrugated structure" in the molded fine corrugated structure formation layer had a projection width of 10 µm, a recess width of 5 µm, and a recess depth of 2 µm.

The corrugated structure for forming the line tone barrier layer 3 was obtained in this manner.

Then, an ink composition of a "corrugated structure formation layer" such as that described below was prepared to form the multiple-image formation layer 4 on the surface of the support base material opposite to the surface where the corrugated structure for forming the line tone barrier layer 3 was formed, and gravure printing was performed to obtain a dried film having a thickness of 5 µm.

"Corrugated structure formation layer ink composition" (ultraviolet-curable resin)

Urethane (meth)acrylate (polyfunctional, molecular weight 6,000) 50.0 parts by weight Methyl ethyl ketone 30.0 parts by weight Ethyl acetate 20.0 parts by weight Photoinitiator (IRGACURE 184 manufactured by Ciba Specialty) 1.5 parts by weight A roll photopolymer process was employed as a method for forming a corrugated structure on a corrugated structure formation layer.

As described above, gravure printing was performed to apply an "ink composition of a corrugated structure formation layer," with a thickness of 5 µm when dried. Then, a tubular original plate having a corrugated structure shown in FIG. 19 was pressed against the surface to which the ink composition was applied to perform molding under a pressing pressure of 2 Kgf/cm², a pressing temperature of 80° C., and a pressing speed of 10 m/min.

Figure 19:
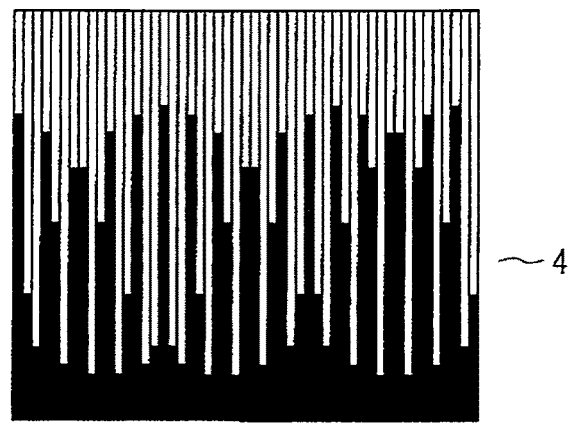
FIG. 19 is a front view illustrating a multiple-image formation layer formed in the first, second, and third embodiments.

In the corrugated structure of FIG. 19, the pixel width of lines was 5 µm, white portions had a scattering corrugated structure (depth of 0.2 µm and random cycle), and black portions had an absorbing corrugated structure (depth of 0.3 µm and cycle of 0.2 µm grid).

At the same time as when the molding was performed, ultraviolet exposure was performed at 300 mJ/cm² with a high-pressure mercury lamp over the support base material formed by a PET film. This transcribed the corrugated shape on the original plate to the "corrugated structure formation layer" and simultaneously cured the transcription.

Then, aluminum vapor deposition was performed to form an electromagnetic wave reflection layer so that an aluminum film obtained a thickness of 0.05 µm (500 Å) at a flat portion.

Then, a "solution of electromagnetic wave absorbing particles," in which carbon black pigments having an average particle diameter of 1 µm was scattered in methyl ethyl ketone (MEK) and to which a vinyl chloride-vinyl acetate copolymer was added at a solid weight ratio of 5%, was applied to the entire surface of the corrugated structure for forming the line tone barrier layer 3. Then, the recesses were filled electromagnetic wave absorbing particles by a doctor blade and dried for 30 seconds in an oven at 120° to obtain the "line tone barrier layer 3."

This formed a multiple-image display body having a total thickness of 33 µm.

Example 2

An ink composition of a "corrugated structure formation layer" such as that described below was prepared to form a corrugated structure of a line tone barrier layer 3 in a multiple-image display body according to the present invention through a photopolymer process.

"Corrugated structure formation layer ink composition" (ultraviolet-curable resin)

Urethane (meth)acrylate (polyfunctional, molecular weight 6,000) 50.0 parts by weight Methyl ethyl ketone 30.0 parts by weight Ethyl acetate 20.0 parts by weight Photoinitiator (IRGACURE 184 manufactured by Ciba Specialty) 1.5 parts by weight A roll photopolymer process was employed as a method for forming a corrugated structure on a corrugated structure formation layer.

Gravure printing was performed to apply an "ink composition of a fine corrugated structure formation layer," with a thickness of 5 µm when dried, to a support base material formed by a transparent polyethylene terephthalate (PET) film having a thickness of 23 µm. Then, a tubular original plate having a corrugated structure was pressed against the surface to which the ink composition was applied to perform molding under a pressing pressure of 2 Kgf/cm², a pressing temperature of 80° C., and a pressing speed of 10 m/min.

At the same time as when the molding was performed, ultraviolet exposure was performed at 300 mJ/cm² with a high-pressure mercury lamp over the support base material formed by a PET film. This transcribed the corrugated shape on the original plate to the "corrugated structure formation layer" and simultaneously cured the transcription. The "corrugated structure" in the molded fine corrugated structure formation layer had a projection width of 10 µm, a recess width of 5 µm, and a recess depth of 2 µm.

The corrugated structure for forming the line tone barrier layer 3 was obtained in this manner.

Then, an ink composition of a "corrugated structure formation layer" such as that described below was prepared to form the multiple-image formation layer 4 on the surface of the support base material opposite to the surface where the corrugated structure for forming the line tone barrier layer 3 was formed, and gravure printing was performed to obtain a dried film having a thickness of 5 µm.

"Corrugated structure formation layer ink composition" (ultraviolet-curable resin)

Urethane (meth)acrylate (polyfunctional, molecular weight 6,000) 50.0 parts by weight Methyl ethyl ketone 30.0 parts by weight Ethyl acetate 20.0 parts by weight Photoinitiator (IRGACURE 184 manufactured by Ciba Specialty) 1.5 parts by weight A roll photopolymer process was employed as a method for forming a corrugated structure on a corrugated structure formation layer.

As described above, gravure printing was performed to apply an "ink composition of a corrugated structure formation layer," with a thickness of 5 µm when dried. Then, a tubular original plate having a corrugated structure shown in FIG. 19 was pressed against the surface to which the ink composition was applied to perform molding under a pressing pressure of 2 Kgf/cm², a pressing temperature of 80° C., and a pressing speed of 10 m/min.

In the corrugated structure of FIG. 19, the pixel width of lines was 5 μm, white portions had a scattering corrugated structure (depth of 0.1 μm and random cycle), and black portions had an absorbing corrugated structure (depth of 0.3 μm and cycle of 0.3 μm orthogonal grid).

At the same time as when the molding was performed, ultraviolet exposure was performed at 300 mJ/cm$^2$ with a high-pressure mercury lamp over the support base material formed by a PET film. This transcribed the corrugated shape on the original plate to the "corrugated structure formation layer" and simultaneously cured the transcription.

Then, aluminum vapor deposition was performed to form an electromagnetic wave reflection layer so that a thickness of 0.05 μm (500 Å) was obtained at a flat portion. Further, magnesium fluoride was vapor-deposited to form a vapor deposition mask layer so that a thickness of 0.03 μm (300 Å) was obtained at a flat portion. (In this case, the surface area of black portions having a high aspect is larger than the surface area of the white portions. Thus, the aluminum film had a small thickness and the magnesium fluoride vapor deposition mask layer had a small thickness. This allows for the removal of only the black portions in the drawing through alkali immersion.)

Then, immersion was performed for 30 seconds in an etching liquid at 50° C. having 0.2% of sodium hydroxide to remove the reflection layer of the black portions in FIG. 19 and obtain transparency. Then, black ink was applied to cover the multiple-image formation layer 4. This obtained the electromagnetic wave absorbing layer.

Then, a "solution of electromagnetic wave absorbing particles," in which carbon black pigments having an average particle diameter of 1 μm was scattered in methyl ethyl ketone (MEK) and to which a vinyl chloride-vinyl acetate copolymer was added at a solid weight ratio of 5%, was applied to the entire surface of the corrugated structure for forming the line tone barrier layer 3. Then, the recesses were filled with electromagnetic wave absorbing particles by a doctor blade and dried for 30 seconds in an oven at 120° to obtain the "line tone barrier layer 3."

This formed a multiple-image display body having a total thickness of 33 μm.

Example 3

An ink composition of a "corrugated structure formation layer" such as that described below was prepared to form a corrugated structure of a line tone barrier layer 3 in a multiple-image display body according to the present invention through a photopolymer process.

"Corrugated structure formation layer ink composition" (ultraviolet-curable resin)
Urethane (meth)acrylate (polyfunctional, molecular weight 6,000) 50.0 parts by weight
Methyl ethyl ketone 30.0 parts by weight
Ethyl acetate 20.0 parts by weight
Photoinitiator (IRGACURE 184 manufactured by Ciba Specialty) 1.5 parts by weight
A roll photopolymer process was employed as a method for forming a corrugated structure on a corrugated structure formation layer.

Gravure printing was performed to apply an "ink composition of a fine corrugated structure formation layer," with a thickness of 5 μm when dried, to a support substrate formed by a transparent polyethylene terephthalate (PET) film having a thickness of 23 μm. Then, a tubular original plate having a corrugated structure was pressed against the surface to which the ink composition was applied to perform molding under a pressing pressure of 2 Kgf/cm$^2$, a pressing temperature of 80° C., and a pressing speed of 10 m/min.

At the same time as when the molding was performed, ultraviolet exposure was performed at 300 mJ/cm$^2$ with a high-pressure mercury lamp over the support base material formed by a PET film. This transcribed the corrugated shape on the original plate to the "fine corrugated structure formation layer" and simultaneously cured the transcription. The "corrugated structure" in the molded fine corrugated structure formation layer had a projection width of 10 μm, a recess width of 5 μm, and a recess depth of 2 μm.

The corrugated structure for forming the line tone barrier layer 3 was obtained in this manner.

Then, an ink composition of a "corrugated structure formation layer" such as that described below was prepared to form a "multiple-image formation layer" on the surface of the support base material opposite to the surface where the corrugated structure for forming the line tone barrier layer 3 was formed, and gravure printing was performed to obtain a dried film having a thickness of 5 μm.

"Corrugated structure formation layer ink composition" (ultraviolet-curable resin)
Urethane (meth)acrylate (polyfunctional, molecular weight 6,000) 50.0 parts by weight
Methyl ethyl ketone 30.0 parts by weight
Ethyl acetate 20.0 parts by weight
Photoinitiator (IRGACURE 184 manufactured by Ciba Specialty) 1.5 parts by weight
A roll photopolymer process was employed as a method for forming a corrugated structure on a corrugated structure formation layer.

As described above, gravure printing was performed to apply an "ink composition of a fine corrugated structure formation layer," with a thickness of 5 μm when dried. Then, a tubular original plate having a corrugated structure shown in FIG. 19 was pressed against the surface to which the ink composition was applied to perform molding under a pressing pressure of 2 Kgf/cm$^2$, a pressing temperature of 80° C., and a pressing speed of 10 m/min.

In the corrugated structure of FIG. 19, the pixel width of lines was 5 μm, white portions had a particle filled corrugated structure (depth of 0.1 μm and random cycle), and black portions were flat.

At the same time as when the molding was performed, ultraviolet exposure was performed at 300 mJ/cm$^2$ with a high-pressure mercury lamp over the PET film. This transcribed the corrugated shape on the original plate to the "corrugated structure formation layer" and simultaneously cured the transcription.

The "particle filled corrugated structure (white portions)" in the molded fine corrugated structure formation layer had a recess width of 5 μm and a recess depth of 2 μm.

Then, a "solution of electromagnetic wave absorbing particles," in which carbon black pigments having an average particle diameter of 1 μm was scattered in methyl ethyl ketone (MEK) and to which a vinyl chloride-vinyl acetate copolymer was added at a solid weight ratio of 5%, was applied to the entire surface of the corrugated structure for forming a multiple-image formation layer. Then, the recesses were filled with electromagnetic wave absorbing particles by a doctor blade and dried for 30 seconds in an oven at 120° to obtain a "multiple-image formation layer." Further, paper was adhered so as to cover the multiple-image formation layer and form an electromagnetic wave scattering layer.

Then, a "solution of electromagnetic wave absorbing particles," in which carbon black pigments having an average particle diameter of 1 μm was scattered in methyl ethyl ketone (MEK) and to which a vinyl chloride-vinyl acetate copolymer was added at a solid weight ratio of 5%, was applied to the entire surface of the corrugated structure for forming the line tone barrier layer 3. Then, the recesses were filled with electromagnetic wave absorbing particles by a doctor blade and dried for 30 seconds in an oven at 120° to obtain a "line tone barrier layer."

This formed a multiple-image display body having a total thickness of 33 μm.

Comparative Example 1

The manufacturing method is similar to that of example 2. However, pixels of a multiple-image formation layer were used to form a stacked body that is shown by the contrast of a smooth aluminum region and a transparent region, which is free from aluminum, when forming a multiple-image display body having a total thickness of 33 μm.

Comparative Example 2

An image display body (security thread) that uses a lens and is watermarked on Danish banknotes (100 Krone) was subject to comparison.

Evaluation method of anti-counterfeiting structures formed in examples and comparative examples Visual evaluation of multiple images in normal situation The multiple-image display bodies formed in examples 1, 2, and 3 and comparative example 1 were prepared. Then, the multiple images were viewed changing the observation angle. Cases in which the multiple images were readable are indicated by "OK" and not readable are indicated by "NG."

Visual evaluation of multiple images onto which salad oil has been dropped

The multiple-image display bodies formed in examples 1, 2, and 3 and comparative example 1 were prepared. Then, 10 g of salad oil was dropped onto the surface of the stacked body (surface of line tone barrier layer in examples, and surface of lens array in comparative example), and the multiple images were left for 30 seconds. Then, the multiple images were viewed changing the observation angle. Cases in which the multiple images were readable are indicated by "OK" and not readable are indicated by "NG."

Evaluation of watermark on security paper

Generally, a film having a thickness of 50 μm or less can be watermarked onto a security paper, and the watermarked paper can undergo printing. Accordingly, in the examples, when the image display body has a total thickness of 50 μm or less, watermarking can be performed. Such cases are indicated by "OK." Cases in which the total thickness exceeds 50 μm are indicated by "NG." Comparison example 1 is indicated as "OK" since the paper has already been watermarked.

The above evaluation methods were used to evaluate the examples and the comparative examples. The results are shown in table 1.

TABLE 1

| Structure | Visual evaluation of multiple images in normal situation | Visual evaluation of multiple images onto which salad oil has been dropped | Evaluation of watermark on security paper (OK when total thickness is 50 μm or less) |
|---|---|---|---|
| Example 1 | OK | OK | OK |
| Example 2 | OK | OK | OK |
| Example 3 | OK | OK | OK |
| Com. Example 1 | NG (image visible in only regular reflection) | NG | OK |
| Comp. Example 2 | OK | NG | OK (paper watermarked) |

It may be understood from table 1 that the visibility in a normal situation in examples 1 to 3 is superior to comparative example 1. This is because the display body uses a scattering structure and thus allows the image contrast to be maintained even in an observation environment other than regular reflection of a light source. The examples obtained superior results.

Further, in examples 1 to 3, "visual evaluation of multiple images onto which salad oil has been dropped" is OK. However, the visibility was insufficient in comparative example 2. As a result, the examples are superior to the comparative example.

In a multiple-image display body according to the present invention, even when an outermost layer is contaminated by a liquid such as oil or a chemical, the desired continuous movement and depth is not lost from the display of multiple images. Further, the contrast of the light intensity is improved even under a regular reflection light source, and a high contrast is obtained from any observation angle. Accordingly, even under an observation condition in which there is only reflection light, high visibility and special light effects are obtained. Thus, the multiple-image display body according to the present invention may be used as an image display body having sufficient anti-counterfeiting effects when applied to, for example, ID cards, passports, and banknotes.

The embodiments and the examples described above are considered to be illustrative and are not intended to restrict the scope of the invention. The embodiments and the examples may be implemented in other various forms and are subject to omissions, substitutions, and changes within the scope of the invention. The embodiments and the examples include the scope of the invention and equivalence of the invention recited in the claims.

DESCRIPTION OF REFERENCE CHARACTERS 1) multiple-image display body, 2) spacer layer, 3) line tone barrier layer, 4) multiple-image formation layer, 5) first region, 6) second region, 7) first image, 8) second image, 9) third image, 10, 10a, 10b) third region, 11, 11a, 11b) fourth region, 12) corrugated structure, 13) electromagnetic wave scattering particles, 14) electromagnetic wave scattering corrugated structure, 15) electromagnetic wave reflection layer, 16) corrugated structure, 17) electromagnetic wave absorbing particles, 18) electromagnetic wave absorbing corrugated structure, 19) electromagnetic wave reflection layer, 20) multiple-image display body, 21) electromagnetic wave absorbing layer, 22) first image, 23) second image, 24) third image, 25, 25a, 25b) third region, 26)

fifth region, 27) corrugated structure, 28) electromagnetic wave scattering particles, 29) electromagnetic wave scattering corrugated structure, 29') electromagnetic wave reflection layer, 30) multiple image display body, 31) electromagnetic wave scattering layer, 32) first image, 33) second image, 34) third image, 35) sixth region, 36) seventh region, 37) corrugated structure, 38) electromagnetic wave absorbing particles, 39) electromagnetic wave absorbing corrugated structure, 39') electromagnetic wave reflection layer, 82a to 82d) observation condition, 83a to 83c) observation image (observation pattern).

The invention claimed is:

1. A multiple-image display body comprising:
    a spacer layer including a first surface and a second surface opposite to the first surface, wherein the spacer layer has the form of a thin film;
    a line tone barrier layer stacked on the first surface of the spacer layer, wherein the line tone barrier layer includes first regions, which transmit electromagnetic waves in at least some wavelength ranges, and second regions, which absorb electromagnetic waves in at least some wavelength ranges, the second regions in a surface contacting the spacer layer have substantially the same width and shape, and the second regions are arranged at equal intervals sandwiching at least portions of the first regions to form a line tone pattern, wherein the second regions have a corrugated structure, and the corrugated structure includes recesses filled with electromagnetic wave absorbing particles that absorb electromagnetic waves in at least some wavelength ranges, and wherein the line tone barrier layer has a high-precision and high-contrast pattern; and
    a multiple-image formation layer stacked on the second surface of the spacer layer, wherein the multiple-image formation layer includes images that are visible when observed from specific angles over the first regions of the line tone barrier layer, wherein each of the images includes a scattering region, which scatters electromagnetic waves transmitted from the line tone barrier layer to the spacer layer in at least some wavelength ranges, and an absorbing region, which absorbs electromagnetic waves transmitted from the line tone barrier layer to the spacer layer in at least some wavelength ranges, and the image is formed by a contrast resulting from an area ratio of the scattering region and the absorbing region.

2. The multiple-image display body according to claim 1, wherein the scattering region has a corrugated structure, and the corrugated structure includes recesses filled with electromagnetic wave scattering particles that scatter electromagnetic waves in at least some wavelength ranges.

3. The multiple-image display body according to claim 1, wherein the scattering region includes a corrugated structure, which is undulated and has a scattering characteristic, and an electromagnetic wave reflection layer, which is arranged on a surface of the corrugated structure.

4. The multiple-image display body according to claim 1, wherein the absorbing region has a corrugated structure, and the corrugated structure includes recesses filled with electromagnetic wave absorbing particles that absorb electromagnetic waves in at least some wavelength ranges.

5. The multiple-image display body according to claim 4, wherein the particles with which the recesses are filled comprise one or more pigments, one or more dyes, one or more metal nanoparticles, or a combination thereof.

6. The multiple-image display body according to claim 4, wherein the particles with which the recesses are filled comprise core shell particles including cores of fine pigments and shells of a thermoplastic or thermosetting resin.

7. The multiple-image display body according to claim 1, wherein the absorbing region includes a corrugated structure, which is undulated and has an absorbing characteristic, and an electromagnetic wave reflection layer, which is arranged on a surface of the corrugated structure.

8. The multiple-image display body according to claim 1, wherein the high-precision and high-contrast pattern of the line tone barrier layer is a high-precision and high-contrast pattern of 10 μm or less.

9. A multiple-image display body comprising:
    a spacer layer including a first surface and a second surface opposite to the first surface, wherein the spacer layer has the form of a thin film;
    a line tone barrier layer stacked on the first surface of the spacer layer, wherein the line tone barrier layer includes first regions, which transmit electromagnetic waves in at least some wavelength ranges, and second regions, which absorb electromagnetic waves in at least some wavelength ranges, the second regions in a surface contacting the spacer layer have substantially the same width and shape, and the second regions are arranged at equal intervals sandwiching at least portions of the first regions to form a line tone pattern, wherein the second regions have a corrugated structure, and the corrugated structure includes recesses filled with electromagnetic wave absorbing particles that absorb electromagnetic waves in at least some wavelength ranges, and wherein the line tone barrier layer has a high-precision and high-contrast pattern;
    a multiple-image formation layer stacked on the second surface of the spacer layer, wherein the multiple-image formation layer includes images that are visible when observed from specific angles over the first regions of the line tone barrier layer, wherein each of the images includes an absorbing region, which absorbs electromagnetic waves transmitted from the line tone barrier layer to the spacer layer in at least some wavelength ranges, and a transmitting region, which transmits electromagnetic waves transmitted from the line tone barrier layer to the spacer layer in at least some wavelength ranges, and the image is formed by a contrast resulting from an area ratio of the absorbing region and the transmitting region; and
    an electromagnetic wave scattering layer arranged on a surface of the multiple-image formation layer opposite to the spacer layer, wherein the electromagnetic wave scattering layer scatters electromagnetic waves transmitted from the line tone barrier layer to the spacer layer and then to the transmitting region.

10. The multiple-image display body according to claim 9, wherein the absorbing region has a corrugated structure, and the corrugated structure includes recesses filled with electromagnetic wave absorbing particles that absorb electromagnetic waves in at least some wavelength ranges.

11. The multiple-image display body according to claim 10, wherein the particles with which the recesses are filled comprise one or more pigments, one or more dyes, one or more metal nanoparticles, or a combination thereof.

12. The multiple-image display body according to claim 10, wherein the particles with which the recesses are filled comprise core shell particles including cores of fine pigments and shells of a thermoplastic or thermosetting resin.

13. The multiple-image display body according to claim 9, wherein the high-precision and high-contrast pattern of the line tone barrier layer is a high-precision and high-contrast pattern of 10 μm or less.

* * * * *